United States Patent
Nakano et al.

(10) Patent No.: US 7,952,040 B2
(45) Date of Patent: May 31, 2011

(54) INHIBITOR SWITCH AND MANUFACTURING METHOD THEREOF

(75) Inventors: Sousuke Nakano, Shizuoka (JP);
Futoshi Shinmura, Shizuoka (JP);
Nobufumi Yamane, Shizuoka (JP);
Hiroki Taniguchi, Shizuoka (JP)

(73) Assignees: Asahi Denso Co., Ltd., Shizuoka (JP);
JATCO Ltd., Shizuoka (JP)

( * ) Notice: Subject to any disclaimer, the term of this patent is extended or adjusted under 35 U.S.C. 154(b) by 297 days.

(21) Appl. No.: 12/250,721

(22) Filed: Oct. 14, 2008

(65) Prior Publication Data

US 2009/0133995 A1 May 28, 2009

(30) Foreign Application Priority Data

Oct. 11, 2007 (JP) ............................. P. 2007-265250

(51) Int. Cl.
*H01H 15/04* (2006.01)
*H01H 65/00* (2006.01)

(52) U.S. Cl. ...................... 200/61.88; 29/622; 200/16 A; 200/61.91; 200/292

(58) Field of Classification Search .................... 29/622; 200/6 R–6 C, 16 R–16 D, 61.85, 61.88, 61.91, 200/292, 547, 549, 550
See application file for complete search history.

(56) References Cited

U.S. PATENT DOCUMENTS

| | | | | |
|---|---|---|---|---|
| 4,595,807 A | * | 6/1986 | DeVera ........................ 200/16 C |
| 5,762,183 A | * | 6/1998 | Iwata ............................ 200/571 |
| 5,860,515 A | * | 1/1999 | Tomotoshi .................... 200/550 |
| 5,949,041 A | * | 9/1999 | Sakairi et al. ............... 200/61.88 |
| 6,154,107 A | * | 11/2000 | Tomotoshi ..................... 335/205 |
| 6,518,525 B1 | * | 2/2003 | Anastasia et al. ........... 200/61.91 |
| 6,921,871 B2 | * | 7/2005 | Nakazawa et al. ........... 200/16 R |

FOREIGN PATENT DOCUMENTS

| | | |
|---|---|---|
| JP | 3-112025 A | 5/1991 |
| JP | 2002-175743 A | 6/2002 |
| JP | 2003-157744 A | 5/2003 |
| JP | 2003-263935 A | 9/2003 |

OTHER PUBLICATIONS

Office Action issued Jul. 28, 2010 in counterpart Korean Application No. 10-2008-0099626.

* cited by examiner

*Primary Examiner* — Michael A Friedhofer
(74) *Attorney, Agent, or Firm* — Sughrue Mion, PLLC

(57) ABSTRACT

An inhibitor switch for detecting a shift position of a select lever is provided with: a terminal block fixed in a transmission case of an automatic transmission; a contact plate provided in the terminal block; an operating portion configured to cooperatively move with the select lever and to move along the contact plate; a movable contact formed on the operating portion and configured to slide on the contact plate to form an electric circuit according to a contact position between the contact plate and the movable contact; at least one disconnecting portion formed in the contact plate and cut at a plurality of positions after the contact plate is provided in the terminal block for interrupting electrical conduction; and at least one set of a plurality of disconnecting holes for cutting the disconnecting portion and formed in the terminal block by primary molding. The disconnecting holes respectively correspond to the plurality of positions at which the disconnecting portion is cut. The plurality of disconnecting holes are sealed by secondary molding after the disconnecting portion is cut.

7 Claims, 8 Drawing Sheets

INHIBITOR SWITCH AND MANUFACTURING METHOD THEREOF

This application claims foreign priority from Japanese Patent Application No. 2007-265250 filed on Oct. 11, 2007, the entire contents of which are hereby incorporated by reference.

BACKGROUND OF THE INVENTION

1. Field of the Invention

The present invention relates to an inhibitor switch, provided in a transmission case of a vehicle automatic transmission, for detecting a shift position of a select lever, and to a manufacturing method thereof.

2. Background Art

Usually, an inhibitor switch is provided in a transmission case of an automatic transmission in an automobile in order to detect a shift position of a select lever. Such inhibitor switch has a terminal block fixed in the transmission case, a contact plate formed in the terminal block, an operating portion which cooperatively moves with the select lever along the contact plate, and a movable contact formed on the operating portion and slidable on the contact plate, so that a predetermined electric circuit can be formed according to a contact position between the contact plate and each of the movable contacts.

The inhibitor switch is operated in oil filled in the transmission case. Consequently, the shift position of the select lever can be detected from the electric circuit formed according to the contact position. A power transmitting path of the automatic transmission can be controlled based on a detected shift position of the select lever (see, e.g., JP-A-2002-175743).

In the inhibitor switch, the contact plate having a plurality of rows of contacts extending in parallel to one another is formed in the terminal block, and a disconnecting portion is formed thereamong for connecting adjacent rows of contacts to prevent the plurality of rows of contacts from being separately disconnected in a manufacturing process. After the contact plate having plurality of rows of contacts integrally united by the disconnecting portion is provided at predetermined positions in the terminal block, the disconnecting portion is cut by a punch or the like to thereby interrupt electrical conduction. Consequently, the contact plate having the plurality of rows of contacts can be prevented from being separated from those of other rows of contacts in the manufacturing process. In addition, after the disconnecting portion is cut, desired electrical conduction can be achieved.

However, in the inhibitor switch, the disconnecting portion is cut only at one portion. Thus, the inhibitor switch has a following problem. That is, usually, electrically conductive foreign substances, such as fine metal particles, are suspended in the oil filled in the transmission case. When such electrically conductive foreign substance adheres to the disconnecting portion of the contact plate astride the cut parts thereof, unintended electrical conduction occurs. Thus, it is possible to cause an electrical failure, such as a short circuit.

In addition, the inhibitor switch has another problem in that when a burr is formed on the terminal block at the molding thereof, or on an edge part of the disconnection portion at the molding thereof, the burr might fall off into and float in the oil in the transmission case.

SUMMARY OF THE INVENTION

One or more embodiments of the invention provide an inhibitor switch that can prevent occurrence of unintended electrical conduction due to electrically conductive foreign substances in oil filled in a transmission case and prevent, even when a burr is generated at a forming of disconnecting holes, the burr from being mixed into the oil in the transmission case, while suppressing the manufacturing cost thereof by cutting disconnection portions which connect contact plates to one another, and provide a manufacturing method for the inhibitor switch.

In accordance with a first aspect of the invention, an inhibitor switch for detecting a shift position of a select lever is provided with: a terminal block fixed in a transmission case of an automatic transmission; a contact plate provided in the terminal block; an operating portion configured to cooperatively move with the select lever and to move along the contact plate; a movable contact formed on the operating portion and configured to slide on the contact plate to form an electric circuit according to a contact position between the contact plate and the movable contact; at least one disconnecting portion formed in the contact plate and cut at a plurality of positions after the contact plate is provided in the terminal block for interrupting electrical conduction; and at least one set of a plurality of disconnecting holes for cutting the disconnecting portion and formed in the terminal block by primary molding, wherein the disconnecting holes respectively correspond to the plurality of positions at which the disconnecting portion is cut, and the plurality of disconnecting holes are sealed by secondary molding after the disconnecting portion is cut.

In accordance with a second aspect of the invention, the contact plate may include a plurality of stages, the stages may respectively include disconnecting portions, and the terminal block may include a plurality of sets of disconnecting holes respectively correspond to the disconnecting portions.

In accordance with a third aspect of the invention, an inhibitor switch is provided with: a terminal block fixed in a transmission case of an automatic transmission; a contact plate formed in the terminal block; an operating portion configured to cooperatively move with the select lever and to move along the contact plate; and a movable contact formed on the operating portion and configured to slide on the contact plate to form an electric circuit according to a contact position between the contact plate and the movable contact, and a method of manufacturing the inhibitor switch includes: providing at least one disconnecting portion in the contact plate; cutting the disconnecting portion at a plurality of positions, after the contact plate is provided in the terminal block, to interrupt electrical conduction; forming at least one set of a plurality of disconnecting holes for cutting the disconnecting portion in the terminal block by primary molding, the disconnecting holes respectively corresponding to the plurality of positions at which the disconnecting portion is cut; and sealing the disconnecting holes by secondary molding after the disconnecting portion is cut.

In accordance with a fourth aspect of the invention, the method may further include: fitting a cutoff member into the disconnecting holes so as to cut the disconnecting portion at the plurality of positions.

In accordance with a fifth aspect of the invention, the method may further include: forming the contact plate in a plurality of stages, the stages respectively including disconnecting portions; providing a plurality of sets of disconnecting holes in the terminal block, wherein the respective sets correspond to the disconnecting portions; and fitting the cutoff member into each of the disconnecting holes to cut each of the disconnecting portions of the plurality of stages of contact plates at a plurality of positions.

According to the first and third aspects of the invention, a single disconnecting portion can be cut at a plurality of positions. Simultaneously with this, a set of a plurality of disconnecting holes for cutting the disconnecting portion is formed in the terminal block by primary molding at positions corresponding to the disconnecting portion. The disconnecting holes are sealed by secondary molding after the disconnecting portion is cut. Thus, occurrence of unintended electrical conduction due to electrically conductive substances in the oil can be prevented. In addition, even when a burr is generated at the forming of the disconnecting holes by primary molding, the burr can be filled by secondary molding. Consequently, the burr can be prevented from being mixed into the oil in the transmission case.

According to the fourth aspect of the invention, the disconnecting portion is cut at the plurality of positions by fitting the cutoff member into the disconnecting holes. Thus, the disconnecting portion can easily be cut with good accuracy by simultaneously fitting the cutoff member, such as punches, into the disconnecting holes, respectively.

According to the second and fifth aspects of the invention, the contact plate includes a plurality of stages. The disconnecting holes are formed at positions respectively corresponding to the disconnecting portions of each of the stage. Thus, the plurality of disconnecting portions of a plurality of stages of the contact plate are cut by simultaneously fitting the cutoff member, e.g., punches into the plurality of disconnecting holes, respectively.

Other aspects and advantages of the invention will be apparent from the following description, the drawings and the claims.

DETAILED DESCRIPTION OF THE EXEMPLARY EMBODIMENTS

An exemplary embodiment of the invention is described by referring to the accompanying drawings.

Figure 1:
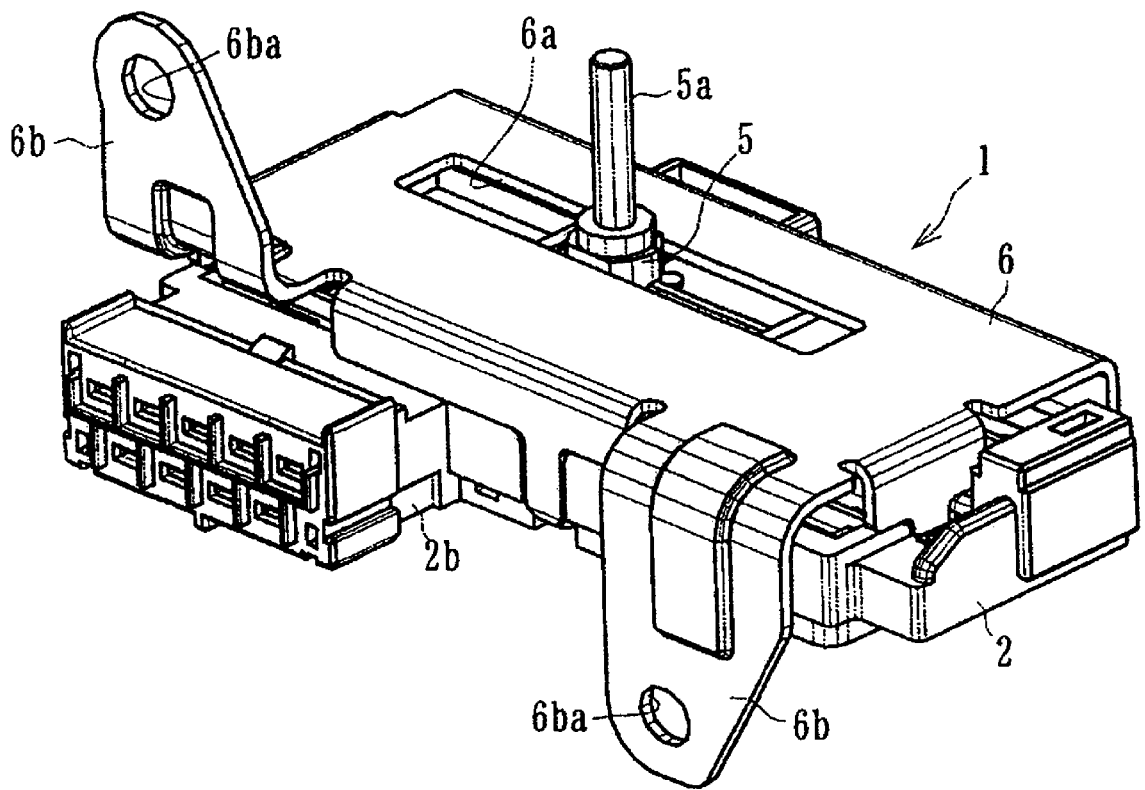
FIG. 1 is an external view illustrating an appearance of an entire inhibitor switch according to an exemplary embodiment.
Figure 2:
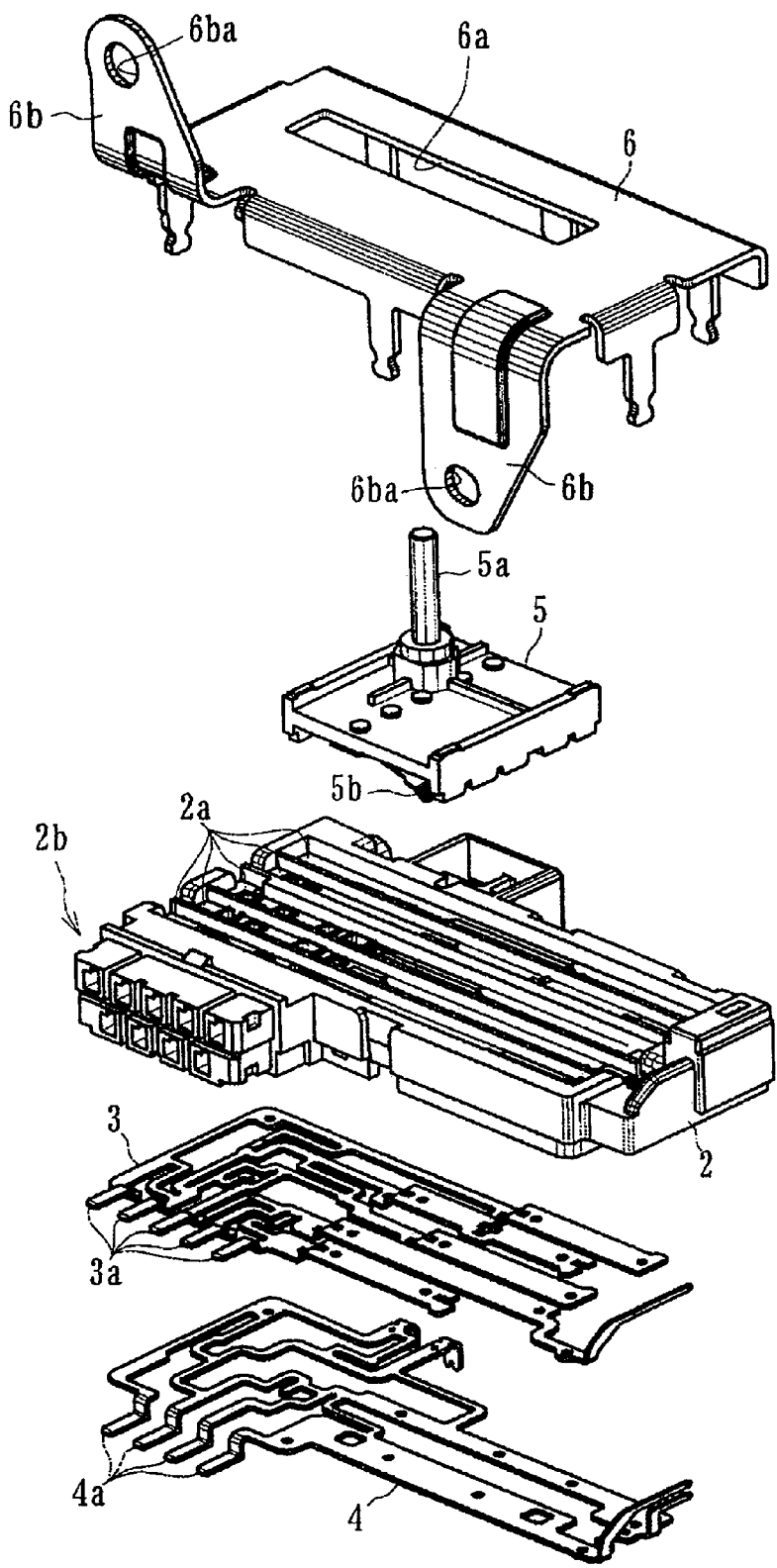
FIG. 2 is an exploded perspective view illustrating an internal configuration of the inhibitor switch.

An inhibitor switch according to the embodiment is provided in a transmission case of a vehicle automatic transmission and is used to detect a shift position of a select lever. As illustrated in FIGS. 1 and 2, the inhibitor switch according to the embodiment mainly includes a terminal block 2 formed of a resin product or the like, metallic contact plates 3 and 4, an operating portion 5 in which a movable contact 5b is formed, and a metallic case 6.

The terminal block 2 has a plurality of groove portions 2a provided in a surface side (top surface side, as viewed in FIGS. 1 and 2) thereof so as to extend in a longitudinal direction thereof. In addition, a connector portion 2b is formed at a predetermined part of a side surface of the terminal block 2 integrally therewith. Two stages, i.e., upper and lower stages 3, 4 of a contact plate are mounted in the terminal block 2 by insert molding. The upper stage of the contact plate 3 is configured so that a part of the surface of the contact plate 3 faces an outside in the groove portions 2a, and that a movable contact 5b, which will be described below, can slide thereon.

These contact plates 3 and 4 are obtained by punching and bending, e.g., electrically conductive metal plates into a predetermined shape, using a press or the like. Terminal portions 3a and 4a are respectively formed at end portions of the upper and lower stages of contact plates 3 and 4. The terminal portions 3a and 4a are set to be placed at the connector portion 2b. Consequently, a detection signal output from the inhibitor switch 1 can be sent to an external device or the like (e.g., a controller provided in the transmission case) by connecting a connector (not shown) formed in the external device to the terminal portions 3a and 4a of the connector portion 2b.

The case 6 is mounted on the terminal block 2 to cover the top surface thereof. A flange portion 6b is formed integrally with the case 6. The case 6 and the terminal block 2 can be fixed to a predetermined position in the transmission case (not shown) by inserting a bolt (not shown) into a bolt hole 6ba formed in the flange portion 6b. Additionally, an elongated hole 6a is formed in the case 6 to linearly extend in the longitudinal direction of the case 6, so that a lever portion 5a of the operating portion 5 is inserted into the elongated hole 6a.

Figure 3:
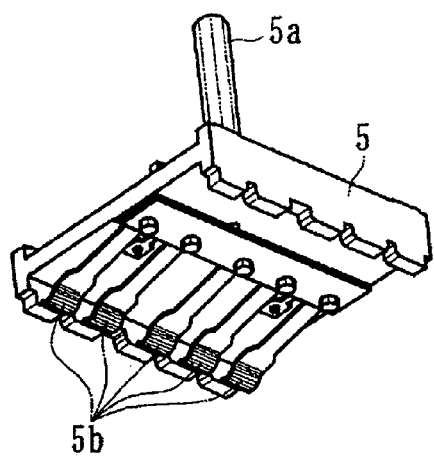
FIG. 3 is a perspective view illustrating an operating portion of the inhibitor switch.

The operating portion 5 can move along the contact plate 5b by interlocking with the select lever. As illustrated in FIGS. 2 and 3, the lever portion 5a, which operates in response to an operation of the select lever, and movable contacts 5b capable of sliding on the contact plate 3 are formed on the operating portion 5. That is, the operating portion 5 is accommodated between the case 6 and the terminal block 2. An operation of the select lever is transmitted to the operating portion 5 via the lever portion 5a provided to protrude from the operating portion 5. The operating portion 5 can slide on the contact plate 3 in response to an operation of the select lever. Incidentally, the movable contacts 5b are respectively formed corresponding to the groove portions 2a formed in the terminal block 2. When the operating portion 5 operates, each of the movable contacts 5b slides on the contact plate 3 in the associated groove portions 2a.

However, the movable contacts 5b are contacted with the contact plate 3 by causing the operating portion 5 to slide on the contact plate 3. Thus, an electrical connection therebetween is achieved. Further, a predetermined electrical circuit is formed according to a contact position therebetween. Accordingly, the shift position of the select lever can be detected from the predetermined electrical circuit. The power transmitting path of the automatic transmission can be controlled according to the shift position of the select lever based on a result of the detection of the shift position. Incidentally, the contact plates 3 and 4 are electrically connected to each other at a predetermined place. The predetermined electrical circuit is formed so as to include the two contact plates 3 and 4.

Figure 4:
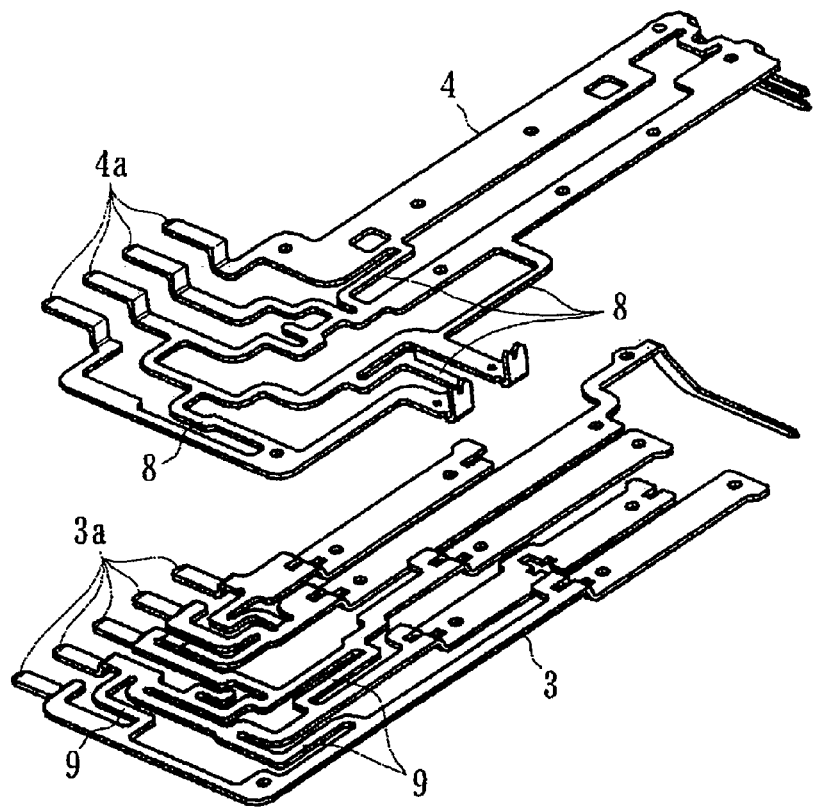
FIG. 4 is a perspective view illustrating contact plates provided at a plurality of stages, i.e., upper and lower stages of the inhibitor switch.

Meanwhile, as illustrated in FIG. 4, disconnecting portions 8 and 9 to be cut after the contact plates 3 and 4 are provided at predetermined positions in the terminal block 2 so as to interrupt electrical conduction, are respectively formed in the contact plates 3 and 4. Such disconnecting portions 8 and 9 are used exclusively to connect adjacent rows or parts of the contact plate 3 or 4 to prevent the contact plates 3 and 4, each of which includes a plurality of rows or a plurality of parts, from being separately disconnected in a manufacturing process. The disconnecting portions 8 and 9 are parts to be cut off from the completed inhibitor switch 1 so as to interrupt electrical conduction.

Figure 5:
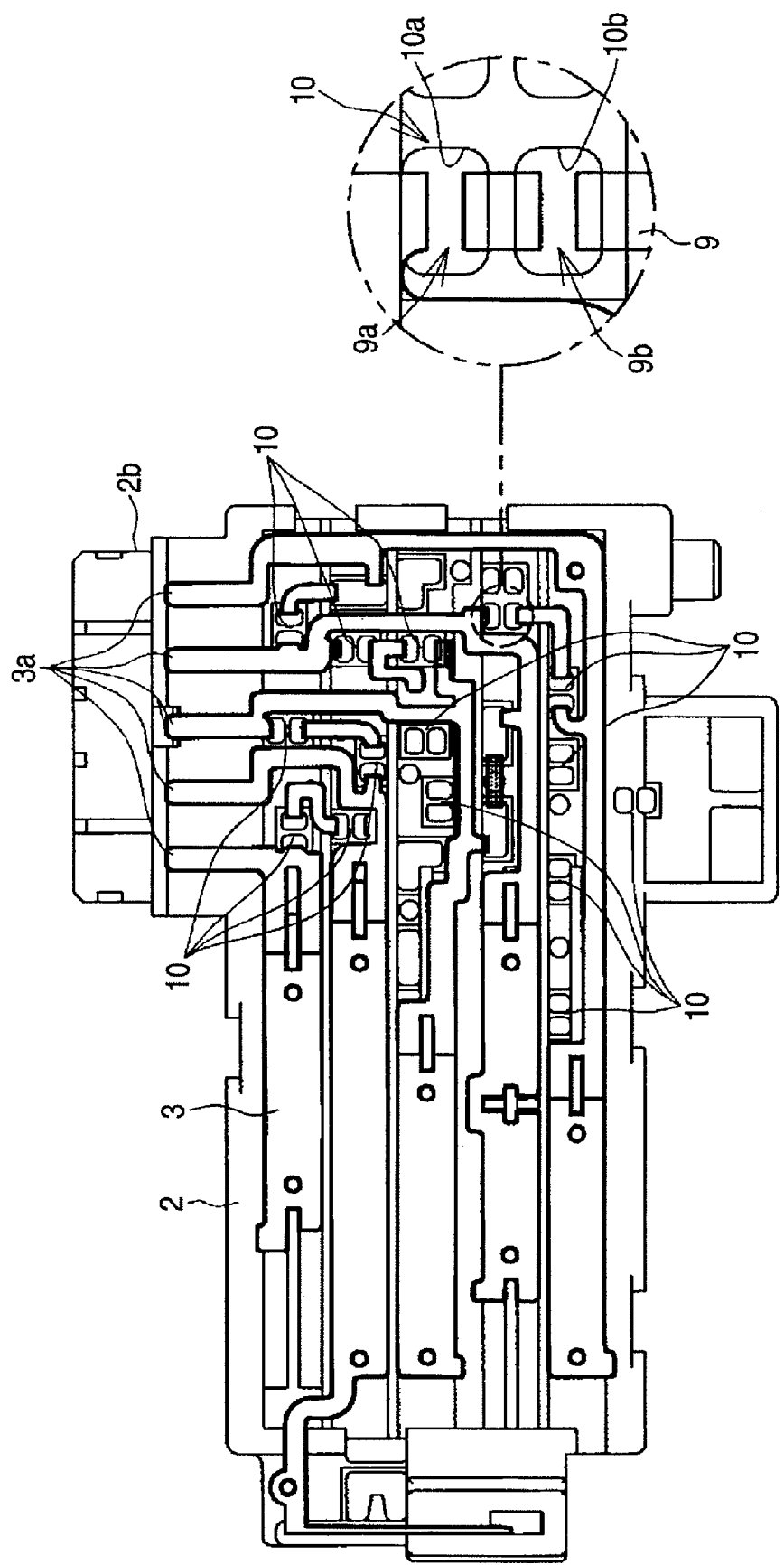
FIG. 5 illustrates a plan view showing the contact plate provided at the upper stage of the inhibitor switch, and an enlarged view showing a place at which a disconnecting portion of this contact plate is cut.
Figure 6:
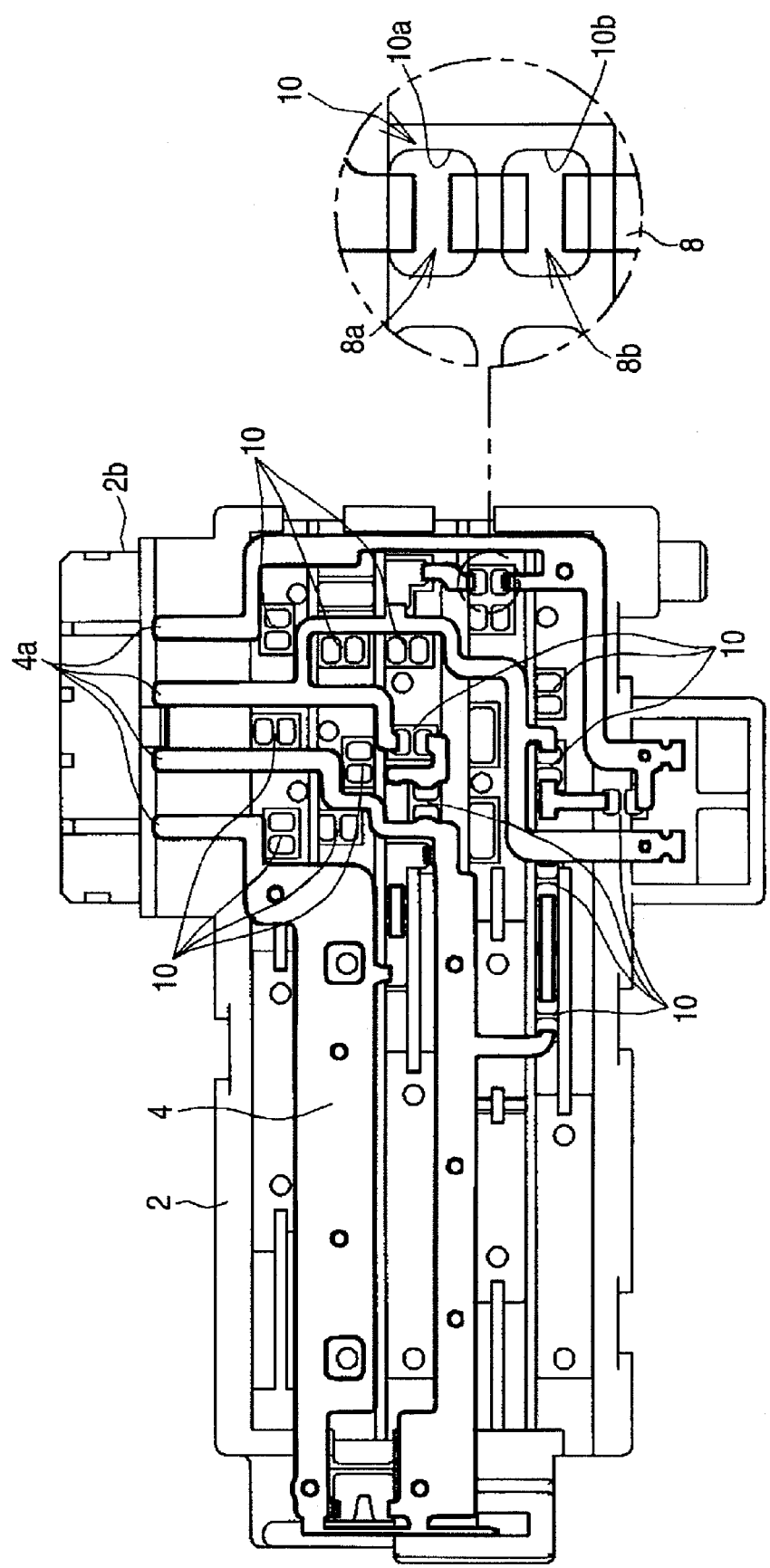
FIG. 6 illustrates a plan view showing the contact plate provided at the lower stage of the inhibitor switch, and an enlarged view showing a place at which a disconnecting portion of this contact plate is cut.
Figure 7:
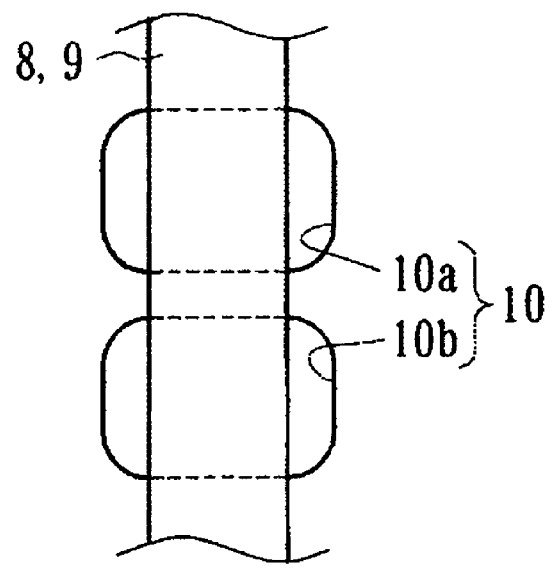
FIG. 7 is a plan view illustrating a method for cutting a disconnecting portion of the inhibitor switch, and illustrating a state before the disconnecting portion is cut.
Figure 8:
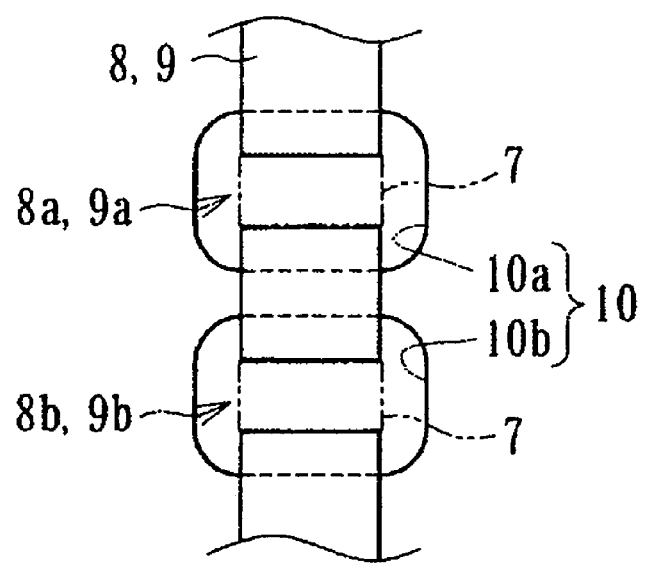
FIG. 8 is a plan view illustrating the method for cutting the disconnecting portion of the inhibitor switch, and illustrating a state after the disconnecting portion is cut.

Furthermore, as illustrated in FIGS. 5 and 6, a plurality of sets of disconnecting holes 10, into each of which a cutoff member such as a punch (see FIG. 8) can be inserted, are formed by primary molding at positions respectively corresponding to the disconnecting portions 8 and 9 in the terminal block 2. Each of the disconnecting holes 10 penetrates through an entire terminal block 2 from the front side to the rear side thereof. As illustrated in FIG. 7, two holes (disconnecting holes 10a and 10b) are formed corresponding to one of the disconnecting portions 8 or 9. Further, as illustrated in FIG. 8, a cutoff member, such as a punch, is fit into each of the disconnecting holes 10a and 10b. Thus, a single disconnecting portion 8 or 9 can be cut at two positions (or a plurality of positions).

Consequently, as illustrated in FIG. 5, in the contact plate 3, one of the disconnecting portions 9 has a plurality of disconnecting positions 9a and 9b. Further, as illustrated in FIG. 6, in the contact plate 4, one of the disconnecting portions 8 has a plurality of disconnecting positions 8a and 8b.

Moreover, because the plurality of disconnecting holes 10a and 10b for cutting the disconnecting portions 8 and 9 are formed in the terminal block 2 at positions respectively corresponding to the disconnecting portions 8 and 9 by primary molding, each of the disconnecting portions 8 and 9 can easily be cut with good accuracy by simultaneously fitting the cutoff member 7, such as punches, into the disconnecting holes 10a and 10b. Furthermore, in a case where the cutoff member 7, such as punches, can simultaneously be fit into the plurality of disconnecting holes 10a and 10b, each of a large number of disconnecting portions 8 and 9 can simultaneously be cut at the plurality of positions. Consequently, the manufacturing process can be further simplified.

Moreover, a plurality of stages, i.e., upper and lower stages of contact plates 3 and 4 are formed in the terminal block 2. In addition, because the disconnecting holes 10a and 10b are formed at the positions corresponding to the disconnecting portions 8 and 9 of the contact plates 3 and 4, the plurality of disconnecting portions 8 and 9 of the plurality of contact plates 3 and 4 can simultaneously be cut.

According to the inhibitor switch 1 of the embodiment, when an operator operates the select lever, the lever portion 5a is operated in response to the operation of the select lever. The operating portion 5 linearly slides on the contact plate 3. Thus, a predetermined electrical circuit is formed according to a contact position therebetween. At that time, the interruption of electrical conduction of each of the disconnecting portions 8 and 9 is surely maintained by employing a plurality of disconnecting positions 8a and 8b (9a and 9b). Thus, occurrence of an electrical failure, such as a short circuit, can surely be prevented. The reliability of the inhibitor switch 1 can be enhanced.

Incidentally, in the present embodiment, the disconnecting holes 10a and 10b formed at the forming of the terminal block 2 by primary molding are configured to be sealed by being filled with a secondary molding resin in a state in which each of the disconnecting portions 8 and 9 is cut. That is, after each of the disconnecting portions 8 and 9 is cut by the cutoff member, such as the punch, a predetermined resin material (secondary molding resin) is filled into the disconnecting holes 10a and 10b at the secondary molding. Thus, in the inhibitor switch 1 obtained as a finished product, the disconnecting holes 10a and 10b are sealed by the secondary molding resin.

Accordingly, the plurality of disconnecting holes 10a and 10b at positions corresponding to the disconnecting portions 8 and 9 for cutting the disconnecting portions 8 and 9 are formed by primary molding at positions corresponding to the disconnecting portions 8 and 9 in the terminal block 2. Then, in the state in which each of the disconnecting portions 8 and 9 is cut, the disconnecting holes 10a and 10b are sealed by secondary molding. Thus, even when a burr is generated at the forming of the disconnecting holes 10a and 10b at the primary molding, the burr is filled with a secondary molding resin at the secondary molding. Consequently, the burr can be prevented from being mixed into oil contained in the transmission case.

A manufacturing method for the aforementioned inhibitor switch 1 is described below.

Figure 9A:
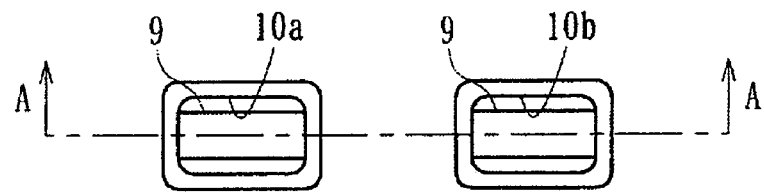
FIG. 9A is a schematic plan view illustrating disconnecting holes formed in a disconnecting portion of the inhibitor switch by primary molding, and illustrating a state of the disconnecting portion before the disconnection portion is cut.
Figure 9B:
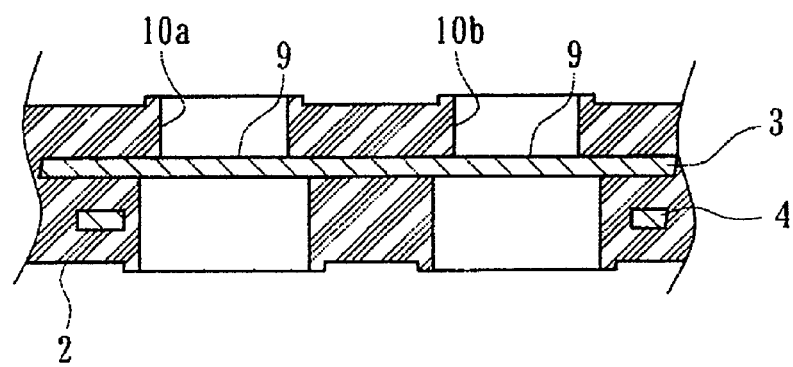
FIG. 9B is a schematic cross-sectional view taken on line A-A shown in FIG. 9A.

First, the contact plates 3 and 4 respectively connected by the disconnecting portions 8 and 9 are preliminarily positioned and fixed to predetermined positions in a forming die for the primary molding of the terminal block 2. Then, a first molding resin is injected into the die for the primary molding. Thus, the terminal block 2 is formed, while the contact plates 3 and 4 are insert-molded. At that time, as illustrated in FIGS. 9A and 9B, each set of the plurality of disconnecting holes 10a and 10b is formed corresponding to one of the disconnecting portions 9 (similarly, such holes are formed corresponding to the disconnecting portion 8 (similarly, the following process can be applied in the case of the disconnecting portion 8)). Consequently, the disconnecting portion 9 can be put into a state in which the disconnecting portion 9 is faced to the outside via the disconnecting holes 10a and 10b.

Figure 10A:
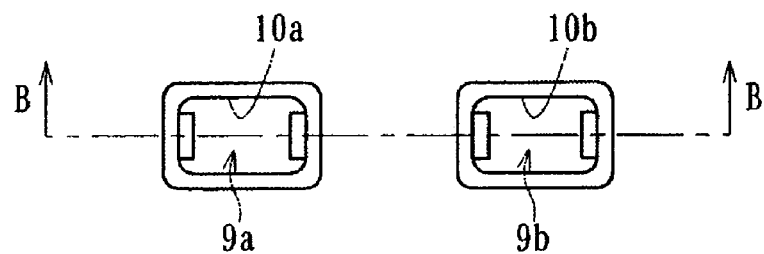
FIG. 10A is a schematic plan view illustrating the disconnecting holes formed in the disconnecting portion of the inhibitor switch by primary molding, and illustrating a state of the disconnecting portion after the disconnection portion is cut.
Figure 10B:
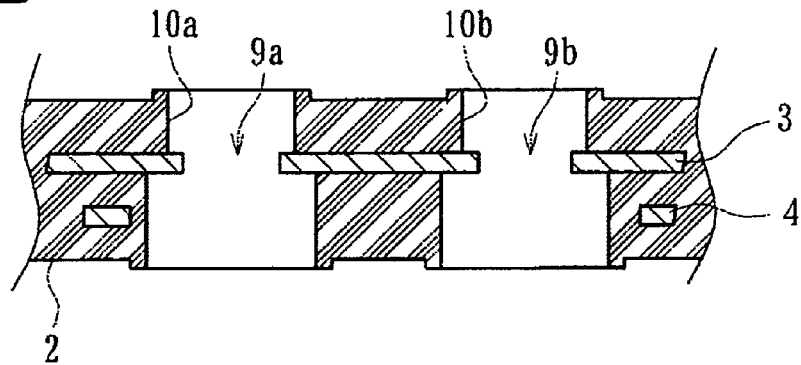
FIG. 10B is a schematic cross-sectional view taken on line B-B shown in FIG. 10A.
Figure 11A:
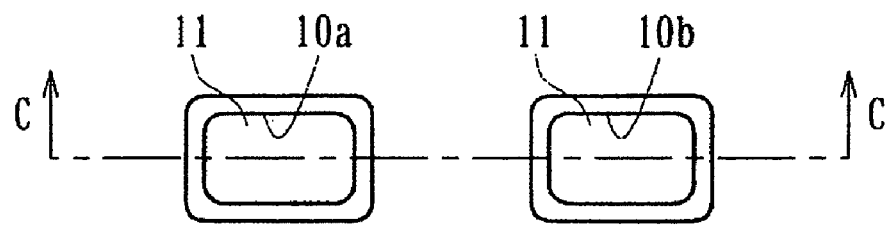
FIG. 11A is a schematic plan view illustrating a state in which the disconnecting holes formed in the disconnecting portion of the inhibitor switch are sealed by secondary molding.
Figure 11B:
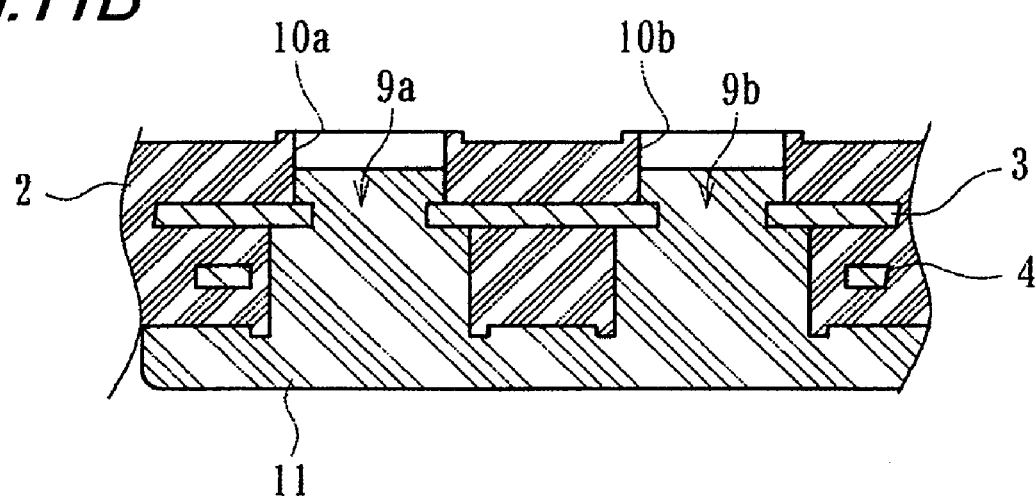
FIG. 11B is a schematic cross-sectional view taken on line C-C shown in FIG. 11C.

As described above, the disconnecting portion 9 is simultaneously cut at the plurality of positions (i.e., the disconnecting positions 9a and 9b), as illustrated in FIGS. 10A and 10B, by fitting the cutoff member 7, such as punches, into the disconnecting holes 10 and 10b after the contact plates 3 and 4 are fixed to the terminal block 2. Then, the terminal block 2 having been put into a state, in which the disconnecting portion 9 is cut at the plurality of positions, is positioned at and fixed to a predetermined position in a forming die for the secondary molding thereof. Subsequently, as illustrated in FIGS. 11A and 11B, the disconnecting holes 10a and 10b are filled with a secondary molding resin 11 by injecting the secondary resin material 11 into the secondary molding die. Consequently, the disconnecting holes 10a and 10b are filled with the secondary molding resin 11.

Thus, the terminal block 2 is obtained, in which the contact plates 3 and 4 are insert-molded, and in which the disconnecting holes 10a and 10b are sealed by secondary molding in a state where the disconnecting portions 8 and 9 are cut. Thus, the inhibitor switch 1 according to the embodiment can be obtained by mounting the operating portion 5 and the case 6 thereon.

Although the embodiment has been described in the foregoing description, the invention is not limited thereto and modified examples are described as follows. For example, one disconnecting portion may be cut at three or more positions, so that three or more disconnecting positions are provided. Further, although the two stages, i.e., the upper and lower stages of contact plates having disconnecting portions are provided in the terminal block, a terminal block including only one stage of a contact plate may be used. Alternatively, a terminal block provided with three or more stages of contact plates may be used. Furthermore, although the operating portion linearly slides on the contact plate in response to an operation of the select lever in the embodiment, instead, an inhibitor switch may be employed, in which the fixed contact is formed like, e.g., a circular arc (or a circumference), and in which the operating portion is slid in an arc-like manner (or in a circumferential manner). Additionally, the primary molding resin used at primary molding may differ in properties from the secondary molding resin used at secondary molding.

Alternatively, the primary molding resin used at primary molding may be the same as the secondary molding resin used at secondary molding.

The invention can be applied to inhibitor switches, which satisfy the following conditions, and to manufacturing methods thereof. That is, in such inhibitor switches, a disconnecting portion, which interrupts electrical conduction by being cut after provided at a predetermined position in a terminal block, is formed in a contact plate. One disconnecting portion is cut at a plurality of positions. In addition, a plurality of disconnecting holes for cutting the disconnecting portion are formed by primary molding. The disconnecting holes are sealed by secondary molding in a state in which the disconnecting portion is cut.

While description has been made in connection with specific exemplary embodiment and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 1 inhibitor switch
2 terminal block
3 contact plate (upper stage)
4 contact plate (lower stage)
5 operating portion
5b movable contact
6 case
7 cutoff member (punch)
8 disconnecting portion
8a, 8b disconnecting positions
9 disconnecting portion
9a, 9b disconnecting positions
10 (10a, 10b) disconnecting holes
11 secondary molding resin

What is claimed is:

1. An inhibitor switch for detecting a shift position of a select lever, comprising:
    a terminal block to be fixed in a transmission case of an automatic transmission;
    a contact plate provided in the terminal block;
    an operating portion configured to cooperatively move with the select lever and to move along the contact plate;
    a movable contact formed on the operating portion and configured to slide on the contact plate to form an electric circuit according to a contact position between the contact plate and the movable contact;
    a disconnecting portion formed in the contact plate and cut at a plurality of positions after the contact plate is provided in the terminal block for interrupting electrical conduction; and
    a plurality of disconnecting holes for cutting the disconnecting portion at the plurality of positions and formed by primary molding in the terminal block at a portion corresponding to the disconnecting portion, wherein the plurality of disconnecting holes are sealed by secondary molding after the disconnecting portion is cut.

2. The inhibitor switch according to claim 1, wherein the contact plate includes a plurality of stages,
    wherein the stages respectively include disconnecting portions, and
    wherein the terminal block includes a plurality of sets of disconnecting holes respectively correspond to the disconnecting portions.

3. The inhibitor switch according to claim 1,
    wherein the contact plate has a plurality of contact portions which are configured to contact the movable contact, and
    wherein the disconnecting portion connects the plurality of contact portions before the disconnecting portion is cut.

4. A method of manufacturing an inhibitor switch for detecting a shift position of a select lever, the inhibitor switch including:
    a terminal block to be fixed in a transmission case of an automatic transmission;
    a contact plate formed in the terminal block;
    an operating portion configured to cooperatively move with the select lever and to move along the contact plate; and
    a movable contact formed on the operating portion and configured to slide on the contact plate to form an electric circuit according to a contact position between the contact plate and the movable contact,
    the method comprising:
    providing a disconnecting portion in the contact plate;
    cutting the disconnecting portion at a plurality of positions, after the contact plate is provided in the terminal block, to interrupt electrical conduction;
    forming a plurality of disconnecting holes, for cutting the disconnecting portion at the plurality of positions, in the terminal block by primary molding at a portion corresponding to the disconnecting portion; and
    sealing the disconnecting holes by secondary molding after the disconnecting portion is cut.

5. The method according to claim 4, further comprising:
    fitting a cutoff member into the disconnecting holes so as to cut the disconnecting portion at the plurality of positions.

6. The method according to claim 5, further comprising:
forming the contact plate in a plurality of stages, the stages respectively including disconnecting portions;
providing a plurality of sets of disconnecting holes in the terminal block, wherein the respective sets correspond to the disconnecting portions; and
fitting the cutoff member into each of the disconnecting holes to cut each of the disconnecting portions of the plurality of stages of contact plates at a plurality of positions.

7. The method according to claim 4,
wherein the contact plate has a plurality of contact portions which are configured to contact the movable contact, and
wherein the disconnecting portion connects the plurality of contact portions before the disconnecting portion is cut.

\* \* \* \* \*